United States Patent [19]

Nagel

[11] Patent Number: 5,294,932
[45] Date of Patent: Mar. 15, 1994

[54] METHOD FOR THE SIMULTANEOUS DETERMINATION OF THE DISTANCE AND THE SPEED OF A TARGET IN A RADAR SYSTEM

[75] Inventor: Dieter Nagel, Erbach, Fed. Rep. of Germany

[73] Assignee: Deutsche Aerospace AG, Munich, Fed. Rep. of Germany

[21] Appl. No.: 971,780
[22] PCT Filed: Jun. 11, 1992
[86] PCT No.: PCT/EP92/01310
§ 371 Date: Feb. 12, 1993
§ 102(e) Date: Feb. 12, 1993
[87] PCT Pub. No.: WO92/22826
PCT Pub. Date: Dec. 23, 1992

[30] Foreign Application Priority Data

Jun. 13, 1991 [DE] Fed. Rep. of Germany ....... 4119509

[51] Int. Cl.$^5$ ............................................. G01S 13/58
[52] U.S. Cl. ..................................... 342/109; 342/111
[58] Field of Search ..................... 342/109, 111, 192

[56] References Cited

U.S. PATENT DOCUMENTS

| | | |
|---|---|---|
| 4,338,604 | 7/1982 | Petitjean . |
| 4,382,258 | 5/1983 | Tabourier . |
| 4,916,452 | 4/1990 | Borchert et al. . |
| 4,920,347 | 4/1990 | Kurihara ..................... 342/192 X |

FOREIGN PATENT DOCUMENTS

0336273A3 10/1989 European Pat. Off. .

*Primary Examiner*—Mark Hellner
*Attorney, Agent, or Firm*—Spencer, Frank & Schneider

[57] ABSTRACT

The invention relates to the simultaneous determination of the distance and the speed of a target in a radar system that operates according to the HPRF (High Pulse Repetition Frequency) method. A target spectrum group is determined in the Doppler domain and the distance of the target is then determined from the group delay.

4 Claims, 2 Drawing Sheets

$V_{-r} = V_{-F} - V_{-a}$ $V_{-F}$ = TARGET SPEED VECTOR
$V_{-a}$ = ANTENNA SPEED VECTOR
$r_0$ = UNITY VECTOR OF THE ANTENNA TARGET CONNECTING LINE

METHOD FOR THE SIMULTANEOUS DETERMINATION OF THE DISTANCE AND THE SPEED OF A TARGET IN A RADAR SYSTEM

BACKGROUND OF THE INVENTION

1. Field of the Invention

The invention relates to a method for the simultaneous determination of the distance and the speed of a target in a radar system.

2. Background Information

In radar systems operating according to the (High Pulse Repetition Frequency) method, the speed can be determined unequivocally up to a maximum speed of approximately Mach nine. The higher the unambiguity range for the determination of the speed, however, the smaller is the unambiguity range in the distance direction for a determination of the distance of a target. Typically, this unambiguity range is presently limited to a maximum distance of approximately one kilometer.

SUMMARY OF THE INVENTION

It is the object of the invention to improve a method of this type in that, while maintaining an unambiguous speed range up to a maximum speed of at least Mach nine, it becomes possible to unambiguously determine the distance of a target in a distance range whose maximum distance limit is substantially greater than one kilometer.

This is accomplished by determining the group delay of the target spectrum in the Doppler domain and determining the distance of the target from the group delay.

One advantage of the invention is that even if a target travels at a maximum speed of Mach nine, its distance can still be unequivocally determined up to a maximum distance of approximately 400 km.

The invention is based on the fact that in an HPRF method the transmitted signals put out by the radar antenna and reflected by a moving target are evaluated in the Doppler domain. For this purpose, the group delay of the target spectrum associated with the moving target is initially determined for the received signal, which essentially corresponds to the reflected transmitted signal, and then the desired distance is determined from the group delay.

BRIEF DESCRIPTION OF THE DRAWINGS

The invention will now be described in greater detail with reference to one embodiment thereof in conjunction with the drawings in which.

DETAILED DESCRIPTION OF THE PREFERRED EMBODIMENT

In the example below it is assumed that a pulse modulated Doppler radar system is available in an airborne vehicle, for example an aircraft, and operates at a high pulse repetition rate, called the "HPRF mode" in the English-language literature. Such a radar system suitable for an airborne vehicle is also called "airborne radar". The HPRF mode is usually employed as a search mode in an airborne radar system.

Figure 1:
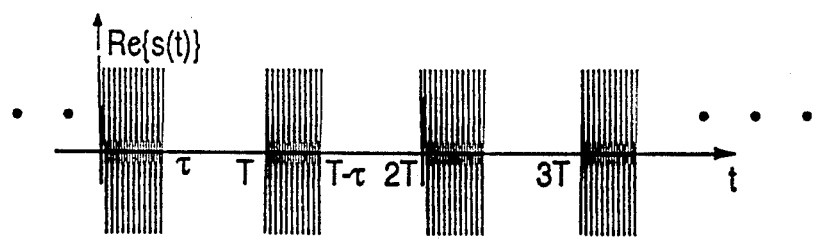
FIG. 1 shows the real component of a transmitted signal versus time.

The real component $Re\{s(t)\}$ (ordinate) of the transmitted signal $s(t)$ of such a search mode is plotted in FIG. 1 over the time t (abscissa). This transmitted signal $s(t)$ is composed of pulses having a time duration $\tau$. The pulses are repeated periodically in time after a pulse repetition time T. The pulses include an alternating voltage signal at a transmitting frequency $f_0$. The points in FIG. 1 indicate that pulses are transmitted successively in time.

The transmitted signal $s(t)$ can be described mathematically as follows:

$$s(t) = \left( \sum_{i=-\infty}^{\infty} r_T(t - iT) \right) e^{j2\pi f_0 t},$$

$f_0$ = transmitting frequency $$r_T(t) = \begin{cases} 1; & \text{for } 0 \leq t \leq \tau \\ 0; & \text{otherwise} \end{cases}$$

where $r_T(t)$ is the normalized amplitude of the transmitted signal.

Figure 2:
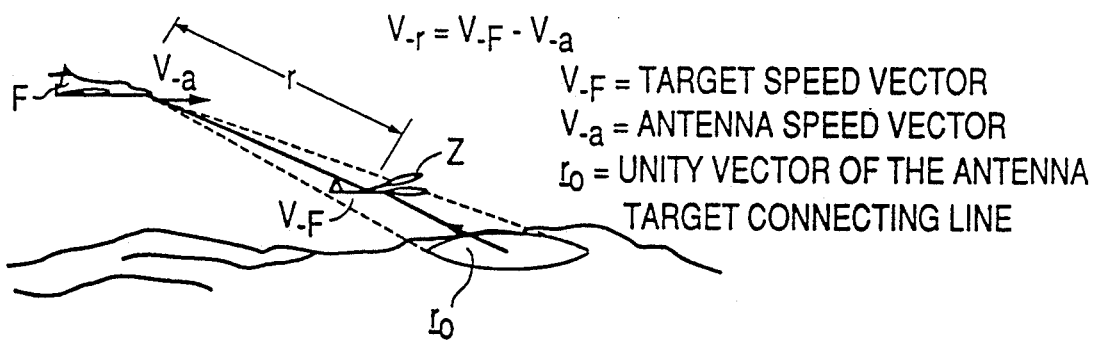
FIG. 2 shows a typical arrangement of an aircraft equipped with a radar system.

FIG. 2 shows a typical arrangement of an aircraft F equipped with a radar system operating in the HPRF mode and a target Z which, for the description below, is considered to be dot shaped.

From such a dot-shaped target Z, which moves from a distance r at a relative speed $v_r$ toward the antenna, the following reflected received signal $s_r(t)$ is obtained:

$$s_r(t) = a \sum_{i=-\infty}^{\infty} r_T(t - iT - t_r) e^{j2\pi(f_0 + f_D) \cdot (t - t_r/2)} \quad (2)$$

In Equation (2) it is not considered that the antenna is directed toward target Z only for a finite time and that the amplitude a of the received signal may fluctuate for real targets. In Equation (2), $t_r$ is the delay of the signal and $f_D$ the Doppler shift. Taking c as the speed of light, the following applies for these two parameters:

$$t_r = \frac{2r}{c} \quad (3a)$$

$$f_D = \frac{2r_0 f_0}{c}(v_F - v_a) \quad (3b)$$

Figure 3:
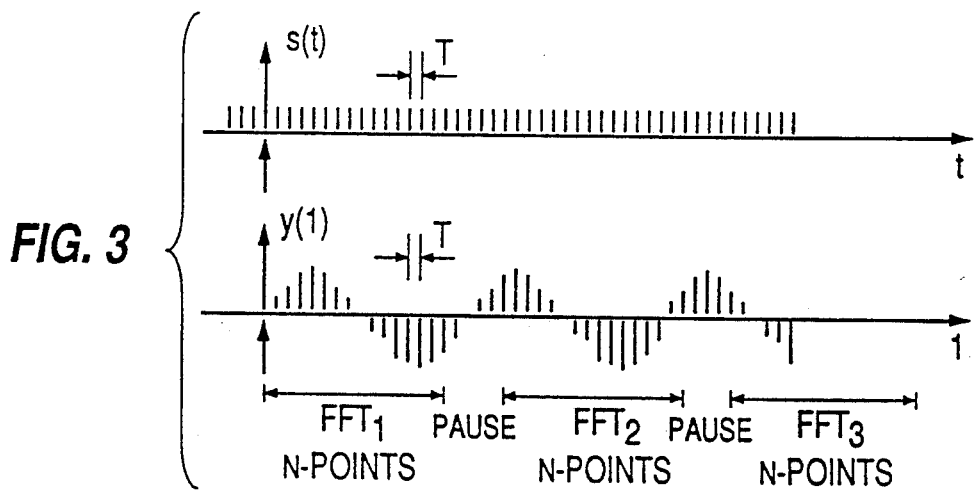
FIG. 3 shows a processing of radar signals.

The signals are processed in the HPRF search mode as described below. First, the received signal $s_r(t)$ is demodulated with transmitting frequency $f_0$ and then it is sampled exactly once within a pulse repetition period T. Then the DFT (FFT) is formed section by section from the sampled signal $y(1)$ for N points (N=2048) as shown in FIG. 3 according to the following formulas:

$$y(t) = s_r(t) e^{-j2\pi f_0 t} \quad (4)$$

$$y(l) = a \sum_{i=-\infty}^{\infty} \delta_0(l - i - N_r) e^{j2\pi f_D l \cdot T + j\phi} \quad N_r = \frac{t_r}{T}$$

$$y_x(m) = \sum_{L=N_x}^{N_x n - 1} y(l) e^{-j\frac{2\pi L m}{N}} \quad x = 1, 2, \ldots$$

The starting point $N_1$ for the first FFT ("Fast Fourier Transformation") is arbitrary. The starting points $N_x$ of the subsequent FFTs then depend on the pause times between the FFTs, the length of the preceding FFTs (in this case, this is always constant $=N$) and the original starting point $N_1$.

Figure 4:
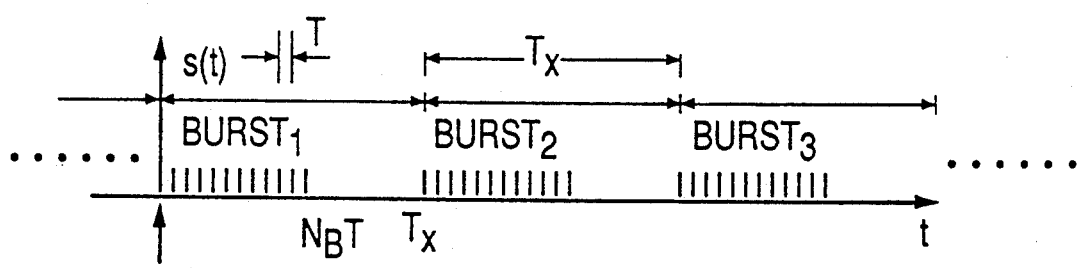
FIG. 4 shows a phase ranging process.
Figure 5:
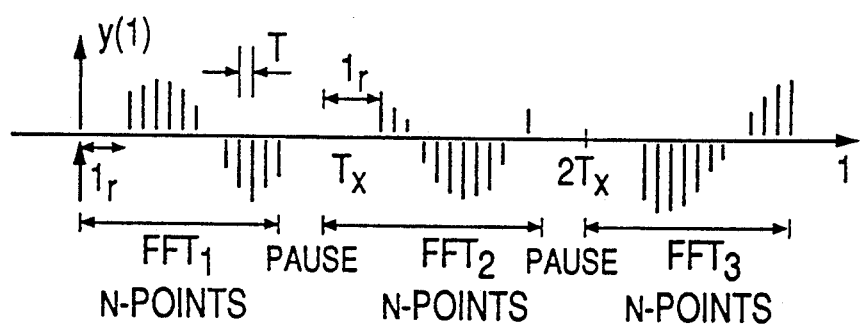
FIG. 5 shows a non-fluctuating received signal.

In the so-called "phase ranging" process according to FIG. 4, the transmitted signal is not composed of a pulse train of infinite length but of bursts of a length $N_BT$. The transmitted signal is further characterized by the burst repetition duration $T_x$. From this it results that the received signal is also divided into bursts. Such a received signal is shown in FIG. 5 for a non-fluctuating target (non-fluctuating received signal). In this case, according to Equation (3a), the delay $t_r$ of the bursts is directly proportional to the distance r of the target. However, if there is a lot of noise interference, the parameter $t_r$ can no longer be determined directly from the time signal. Therefore the delay $t_r$ is estimated with the aid of the phase curve in the FFT. The length N of the FFT must here be selected to be less than the burst repetition duration $T_x$. The following condition results:

$$NT + T_P < T_X \tag{5}$$

where
 $NT$ = length of the FFT
 $T_P$ = pause time
 $T_X$ = burst repetition duration
with $T_P$ being the pause time between the individual FFTs.

In such a phase ranging process the transmitted signal can be described by the following formula:

$$s(t) = \left[ b(t) * \sum_{n=-\infty}^{\infty} \delta_0(t - nT_x) \right] e^{j2\pi f_0 t} \tag{6}$$

where $$b(t) = \sum_{i=0}^{N_B} r_T(t - iT)$$

with * representing the convolution operator.

In contrast to Equation (2), for a non-fluctuating target an associated received signal $s_r(t)$ results according to the following formula:

$$s_r(t) = \left[ b(t - t_r) * \sum_{n=-\infty}^{\infty} \delta_0(t - nT_x) \right] e^{j2\pi(f_0 + f_D)(t - t_r/2)} \tag{7}$$

This received signal is demodulated with the aid of transmitting frequency $f_O$ so that a demodulated signal $y(t)$ results according to the following formula:

$$y(t) = s_r(t) e^{-j2\pi f_0 t} \tag{8}$$

If now the Fourier transform is formed for only one burst from this reflected signal which is shifted in time with respect to the transmitted signal, according to the following formulas:

$$Y_x(f) = \int_{(x-1)T_x}^{xT_x} y(t) e^{-j2\pi f t} dt \tag{9}$$

-continued $$Y_x(f) = \int_0^{T_x} b(t - t_r) e^{j2\pi f_D t + j\phi_x} e^{-j2\pi f t} dt$$

$$Y_x(f) = B(f - f_D) e^{j2\pi f t_r + j\phi_x} \tag{10}$$

$$Y_x(f) = |Y_x(f)| e^{j\psi_x(f)}$$

the delay $t_r$ is contained in all phase curves $\psi_x(f)$ proportional to the frequency f, according to the following formulas:

$$\psi_x(f) = Im\{log Y_x(f)\}$$

$$\psi_x(f) = 2\pi f t_r + \phi_X \tag{11}$$

The phase derivation according to the frequency yields the group delay $t_{gx}(f)$ as follows:

$$t_{gx}(f) = \frac{\partial \psi_x(f)}{\partial f} = 2\pi t_r = \frac{4\pi}{c} r \tag{12}$$

which is then directly proportional to the distance r of the target.

For lower signal to noise ratios (S/N < 30 dB), $t_{gx}(f)$ is advantageously estimated at frequency point $f = f_O$.

If a radar system operates, for example, in an HPRF mode which employs the following data:
  pulse repetition duration T (=1 /pulse repetition rate) = 5.0 μsec = 1/(200 kHz);
  duty cycle $\tau/T$: $0.1 \leq \tau/T \leq 0.4$;
  FFT length N: 2048;
  burst repetition duration $T_x$: 11 msec > 2048 T + $T_F$;
such a radar system is able to unequivocally determine the distance of a target, e.g., an aircraft, moving at a high speed up to a maximum distance of approximately 400 km.

The invention is not limited to the described embodiment but can be applied in the same sense for others. For example, such a radar system may also be employed in a stationary or mobile surveillance system on the ground.

I claim:

1. A method for simultaneously determining the distance and speed of a target in a radar system operating according to the high pulse repetition frequency method, comprising:
  if a target is reported, determining the group delay of a target spectrum in the Doppler domain; and
  determining the distance of the target from the group delay;
wherein:
  a transmitted signal is employed which contains pulses that include an alternating voltage signal component at a transmitting frequency;
  a predetermined number of pulses are combined into a burst;
  bursts are transmitted at a burst repetition duration;
  a demodulated signal is sampled precisely once within a pulse repetition duration so that a sampled signal results;
  the sampled signal is processed with a fast Fourier transformation operation;
  the Fourier transform is formed in each case from a reflected burst and thus from a burst that is shifted in time relative to the transmitted signal;
  a phase curve of the Fourier transform is determined at a frequency point equal to a Doppler frequency;

the phase curve is differentiated according to the frequency and the group delay at the frequency point; and the distance of the target is determined from the group delay.

2. A method according to claim 1, wherein, in a received signal generated from a transmitted signal by reflection at a target, the group delay of a target Doppler spectrum of at least one burst is determined and the distance of the target is determined from the group delay.

3. A method according to claim 1, wherein the length of the fast Fourier transformation is selected to be less than the burst repetition duration.

4. A method according to claim 1, wherein the radar system operating in the high pulse repetition frequency mode is an onboard radar in an aircraft.

* * * * *